United States Patent
Ca et al.

(10) Patent No.: US 8,906,114 B2
(45) Date of Patent: Dec. 9, 2014

(54) METHOD AND APPARATUS FOR PROTECTING A DEVICE CONNECTED TO A NETWORK

(75) Inventors: Jalaludeen Ca, Bangalore (IN); Nandakumar Gn, Bangalore (IN)

(73) Assignee: Agere Systems LLC, Allentown, PA (US)

( * ) Notice: Subject to any disclaimer, the term of this patent is extended or adjusted under 35 U.S.C. 154(b) by 1001 days.

(21) Appl. No.: 12/467,505

(22) Filed: May 18, 2009

(65) Prior Publication Data

US 2009/0228992 A1 Sep. 10, 2009

Related U.S. Application Data

(63) Continuation of application No. 09/876,568, filed on Jun. 7, 2001, now abandoned.

(51) Int. Cl.
| | | |
|---|---|---|
| G08B 25/00 | (2006.01) | |
| H04L 12/26 | (2006.01) | |
| G08B 13/14 | (2006.01) | |
| H04L 12/24 | (2006.01) | |
| G06F 21/88 | (2013.01) | |

(52) U.S. Cl.
CPC ........ G08B 13/1418 (2013.01); H04L 43/0811 (2013.01); H04L 41/12 (2013.01); G06F 21/88 (2013.01); H04L 41/06 (2013.01)
USPC ........................................................ 726/35

(58) Field of Classification Search
USPC ........................................................ 726/35
See application file for complete search history.

(56) References Cited

U.S. PATENT DOCUMENTS

| | | | |
|---|---|---|---|
| 5,231,375 A | 7/1993 | Sanders et al. | 340/568.2 |
| 5,372,436 A | 12/1994 | Kimura | |
| 5,630,058 A | 5/1997 | Mosley et al. | 713/201 |
| 5,689,416 A | 11/1997 | Shimizu et al. | |
| 5,805,880 A | 9/1998 | Pearce et al. | 713/2 |
| 6,021,493 A * | 2/2000 | Cromer et al. | 726/35 |
| 6,140,923 A | 10/2000 | Lam | 340/568.7 |
| 6,294,995 B1 * | 9/2001 | Patterson | 340/571 |
| 6,308,272 B1 * | 10/2001 | Pearce | 726/22 |

(Continued)

FOREIGN PATENT DOCUMENTS

JP 2000-259274 * 9/2000

OTHER PUBLICATIONS

Jumes (Jumes, Cooper, Chamoun and Feinman, "Microsoft Technical Reference, Microsoft Windows NT 4.0 Security, Audit and Control", 1999, ISBN: 157231818X), p. 134 and 195.*

(Continued)

*Primary Examiner* — Peter Poltorak

(57) ABSTRACT

A method and apparatus are disclosed for detecting the removal of a device connected to a network. The present invention generates an alarm on a protected device when an unauthorized user disconnects the device from a network connection. The network connection is monitored and an alarm is generated if the protected device is disconnected from the network connection without proper notification to the theft protection utility. A number of fail-safe features can optionally be employed to ensure that the theft protection aspects of the present invention are not bypassed. For example, the theft protection utility process can employ speaker, volume and/or power control features to ensure that the alarms generated by the present invention, or the theft protection feature itself, cannot be bypassed.

20 Claims, 2 Drawing Sheets

(56) References Cited

U.S. PATENT DOCUMENTS

| | | | |
|---|---|---|---|
| 6,389,853 B1* | 5/2002 | Pate et al. | 70/18 |
| 6,970,095 B1* | 11/2005 | Lee et al. | 340/669 |
| 2003/0014660 A1* | 1/2003 | Verplaetse et al. | 713/200 |
| 2003/0101251 A1 | 5/2003 | Low | |
| 2003/0105850 A1* | 6/2003 | Lean et al. | 709/223 |

OTHER PUBLICATIONS

Webster ("Merriam-Webster's Collegiate Dicdtionary", Tenth Edition, ISBN: 0-87779-708-0, 1997), p. 15.*

Mark Minasi, Mastering Windows NT Server 4, 6th edition, 1999. ISBN: 0782124453.

Mark G. Sobell, A Practical Guide to the UNIX System, 3rd edition, 1997, ISBN: 0805375651.

Thurrott (Paul Thurrott, "Whats' New in Windows 2000 RC2 Reviewed," http://www.winsupersite.com/reviews/win2k_rc2_whatsnew.asp), p. 1-3.

ActiveWin, "Windows 2000 History," http://www.activewin.com/win2000/history.shtml, (p. 1 and 2).

Mark Minasi, Mastering Windows NT Server 4, 6th edition, 1999, ISBN: 0782124453.

Thurrott (Paul Thurrott, "What's new in Windows 2000 RC2 Reviewed", http://www.winsupersite.com/reviews/win2k_rc2_whatsnew.asp), p. 1-3.

ActiveWin, "Windows 2000 History", http://www.activewin.com/win2000/history.shtml, (p. 1 and 2).

Sippl et al., "Computer Dictionary & Handbook," 3rd Edition, ISBN: 0-672-21632-9 (1980).

* cited by examiner

METHOD AND APPARATUS FOR PROTECTING A DEVICE CONNECTED TO A NETWORK

CROSS-REFERENCE TO RELATED APPLICATIONS

This application is a continuation of U.S. patent application Ser. No. 09/876,568, filed Jun. 7, 2001, incorporated by reference herein.

FIELD OF THE INVENTION

The present invention relates generally to computer security techniques, and more particularly, to methods and apparatus for preventing the removal of a portable computer connected to a network.

BACKGROUND OF THE INVENTION

It is an unfortunate fact of modern life that laptop computers and other portable devices are often stolen. The financial loss to the owner of the device must be measured in terms of the fair market value of the stolen item, as well as the value of any data or other information that was stored on the stolen device. Thus, the actual costs of such a loss can often be significant, especially when the data or information stored on the stolen device includes proprietary or non-recoverable information. Significantly, the trend in the consumer marketplace is towards ever smaller and lighter electronic devices, thereby making such devices even easier to conceal and steal.

A number of mechanical techniques have been proposed to prevent the theft of such devices. For example, a number of physical locks are commercially available that allow a user to secure a laptop or another device. Such hardware solutions, however, require the user to carry around additional hardware and increase the size and weight of the portable device. A need therefore exists for a mechanism to prevent the theft of a portable device that does not require the user to carry around additional hardware. A further need exists for a software-based mechanism to prevent theft of a portable device. Yet another need exists for a method and apparatus for preventing theft of a portable device that does not increase the size or weight of the portable device.

SUMMARY OF THE INVENTION

Generally, a method and apparatus are disclosed for detecting the removal of a device connected to a network. The present invention generates an alarm on a protected device when an unauthorized user disconnects the device from a network connection. A theft protection utility process monitors the network connection and generates an alarm if the protected device is disconnected from the network connection without proper notification to the theft protection utility process.

The present invention optionally incorporates a number of fail-safe features that ensure that the theft protection aspects of the present invention cannot be bypassed. For example, the theft protection utility process of the present invention can employ speaker, volume and/or power control features to ensure that the alarms generated by the present invention, or the theft protection feature itself, cannot be bypassed. In one exemplary embodiment, a control of a device is prevented from being adjusted in response to an alarm being generated.

A more complete understanding of the present invention, as well as further features and advantages of the present invention, will be obtained by reference to the following detailed description and drawings.

DETAILED DESCRIPTION

Figure 1:
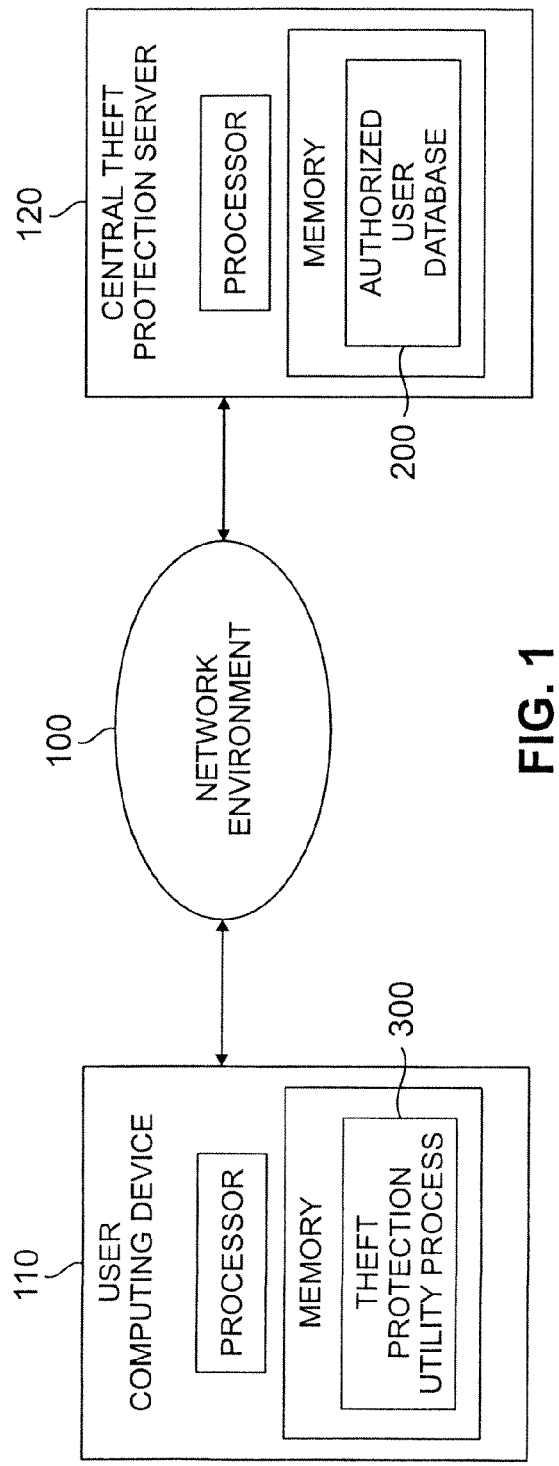
FIG. 1 illustrates an exemplary network environment in which the present invention can operate.

FIG. 1 illustrates a network environment 100 in which the present invention can operate. As shown in FIG. 1, a user computing device 110 is connected over a network 100 to one or more servers 120. According to one aspect of the present invention, an alarm on the user computing device 110 is automatically triggered when the device is disconnected from a network connection by an unauthorized user. It is noted that the user computing device 110 is only one example of a device that may be protected using the present invention. The present invention may be employed to prevent the unauthorized removal of any device having a connection to a network, as would be apparent to a person of ordinary skill in the art based on the disclosure herein.

Thus, the user computing device 110 may be embodied, for example, as any device that can be connected to a network 100, such as a portable computer, workstation or personal digital assistant (PDA). The network 100 may be embodied as any wired or wireless local or wide area network (LAN or WAN, respectively), including the Public Switched Telephone Network (PSTN), a corporate intranet or the Internet (World Wide Web), or any combination of the foregoing. In another variation, the network 100 may be embodied as a cable network, an optical network or a digital satellite service (DSS) network for distributing media content. In such as media distribution network environment, the user computing device 110 may be embodied, for example, as a set-top terminal, cable-enabled media player (e.g., a television) or another decryption device. In the exemplary embodiment of the present invention, the user computing device 110 communicates with a special-purpose central theft protection server 120 over the network 100. However, the functions performed by the central theft protection server 120 in accordance with the present invention can be performed by any server or computer connected to a network, as would be apparent to a person of ordinary skill in the art based on the disclosure herein.

As shown in FIG. 1, the memory of the central theft protection server 120 includes an authorized user database 200, discussed below in conjunction with FIG. 2. Generally, the authorized user database 200 identifies each authorized user of the network 100 and provides a corresponding password that may be utilized in various embodiments of the present invention to prevent theft of the user computing device 110. In addition, the memory of the user computing device 110 includes a theft protection utility process 300, discussed below in conjunction with FIG. 3. In the exemplary embodiment, the user computing device 110 employs the theft protection utility process 300 to monitor the network connection and generate an alarm if the user computing device 110 is disconnected from the network connection without proper notification to the theft protection utility process 300.

Figure 2:
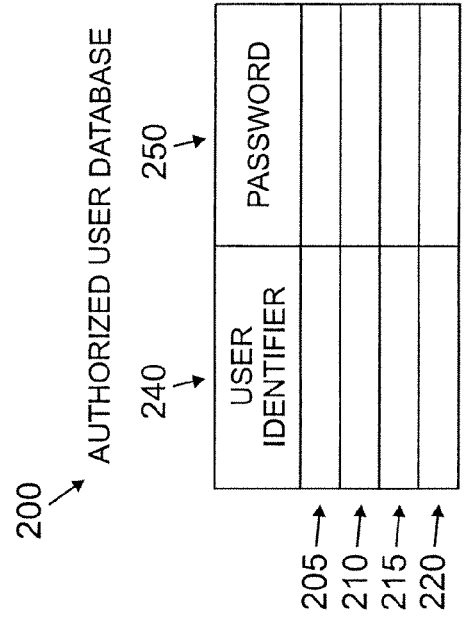
FIG. 2 is a sample table from the authorized user database maintained by the central theft protection server of FIG. 1.

FIG. 2 is a sample table from the authorized user database 200 maintained by the central theft protection server 120 of FIG. 1. Generally, the authorized user database 200 identifies each authorized user of the network 100 and provides a corresponding password that may be utilized in various embodiments of the present invention to prevent theft of the user computing device 110. Thus, as shown in FIG. 2, the authorized user database 200 includes a plurality of records 205-220, each associated with a different authorized user. For each user identified in field 240, the authorized user database 200 indicates the user's password in field 250. In this manner, when the user attempts to remove the user computing device 110 from the network connection, the user can optionally be prompted by the central theft protection server 120 to enter a password.

Figure 3:
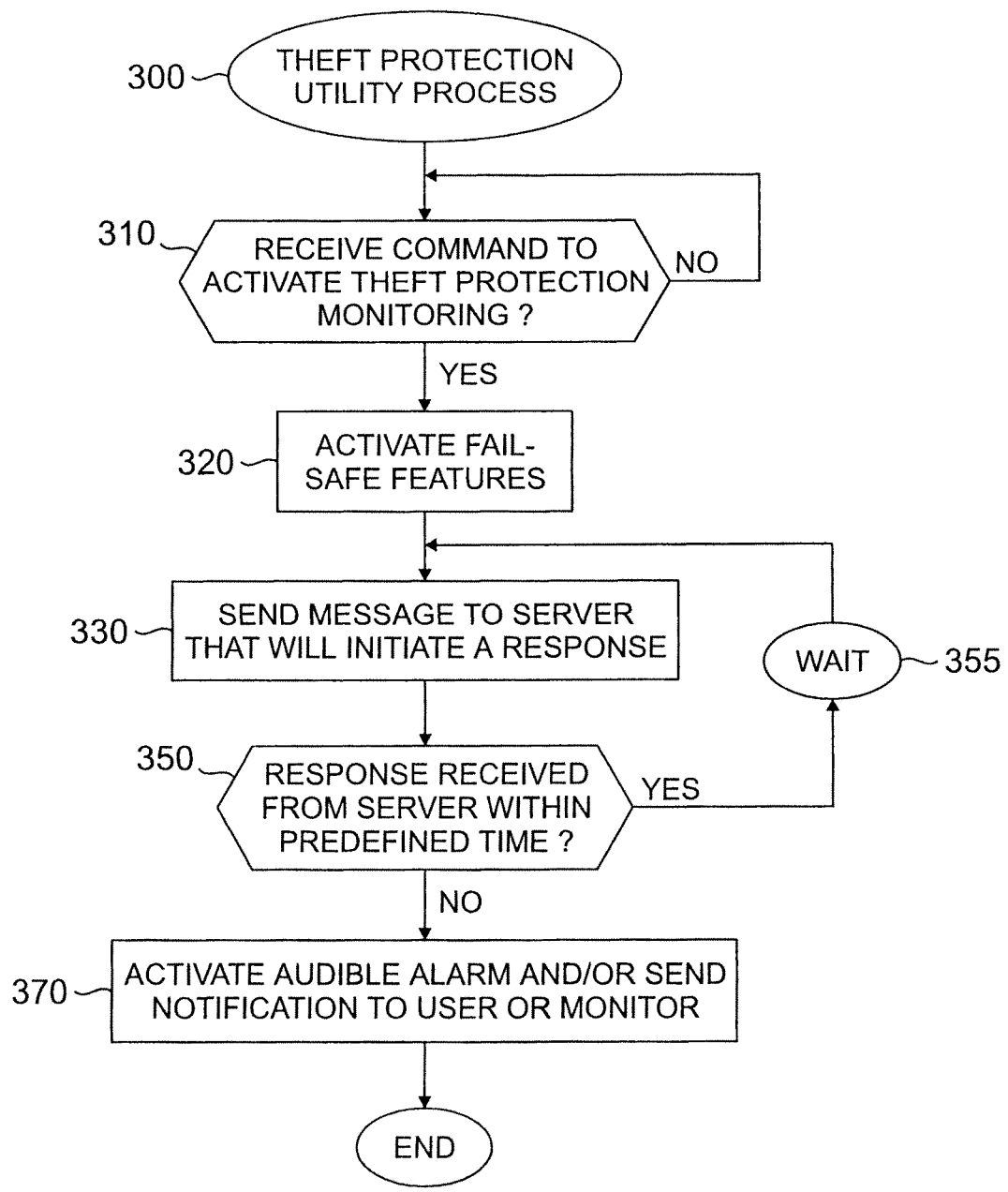
FIG. 3 is a flow chart describing an exemplary theft protection utility process incorporating features of the present invention and implemented by the user computer device of FIG. 1.

FIG. 3 is a flow chart describing an exemplary theft protection utility process 300 incorporating features of the present invention. Generally, the user computing device 110 employs the theft protection utility process 300 to monitor the network connection and generate an alarm if the user computing device 110 is disconnected from the network connection without proper notification to the theft protection utility process 300.

As shown in FIG. 3, the theft protection utility process 300 initially performs a test during step 310 to determine if a command is received to activate the theft monitoring protection feature provided by the utility process 300. For example, a command to activate the theft protection utility process 300 may be automatically generated when power is applied to the user computing device 110 or whenever a network connection is present. In addition, the activation may be passive or active, as would be apparent to a person of ordinary skill in the art, and may optionally be combined with password protection to activate and deactivate the theft protection utility process 300. In an active embodiment, the user can manually invoke the utility before leaving the device 110. In a passive embodiment, the theft protection utility process 300 can be automatically activated, for example, if the user computing device 110 is inactive for a period of time, such as when a screensaver is activated.

If it is determined during step 310 that such a command is not received to activate the theft monitoring protection feature, then program control returns to step 310, which will be periodically reexecuted to determine if the process is activated. If, however, it is determined during step 310 that a command is received to activate the theft monitoring protection feature, then fail-safe features of the present invention are optionally activated during step 320. The theft protection utility process 300 optionally incorporates a number of fail-safe features that ensure that the theft protection aspects of the present invention cannot be bypassed. For example, the theft protection utility process 300 can employ:

(i) a speaker control feature that ensures that a speaker associated with the user computing device 110 cannot be disconnected, to thereby prevent an alarm from being heard;

(ii) a volume control feature that ensures that the volume of the speaker cannot be turned down or muted;

(iii) a power control feature that ensures that an unauthorized user cannot turn off the power of the device and bypass the theft protection utility (e.g., disable the power/reset switch automatically while the theft protection utility process 300 is active); or (iv) a combination of the foregoing.

Thereafter, the theft protection utility process 300 will send a message to the central theft protection server 120 during step 330 that will initiate a response. In this manner, the theft protection utility process 300 polls the server 120 to ensure that a network connection is present. In further variations, the theft protection utility process 300 can poll one or more network ports on the user computing device 110 to see if they are connected or listen for a "heartbeat" message from a remote device, such as a server.

A test is performed during step 350 to determine if a response was received from the central theft protection server 120. If it is determined during step 350 that a response was received from the central theft protection server 120, then the network connection is still present (and the user computing device 110 is still connected to the network 100). The polling process should be performed at periodic or intermittent time intervals, so a wait command is performed during step 355 before program control returns to step 330.

If, however, it is determined during step 350 that a response was not received from the central theft protection server 120, then the network connection is no longer present (and the user computing device 110 is no longer connected to the network 100). Thus, an audible alarm on the user computing device 110 is activated during step 370 or a notification is sent to the user or a monitor, for example, using a cellular connection. Program control then terminates.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The memories shown in FIG. 1 will configure the processors to implement the methods, steps, and functions disclosed herein. The memory could be distributed or local and the processor could be distributed or singular. The memory could be implemented as an electrical, magnetic or optical memory, or any combination of these or other types of storage devices. Moreover, the term "memory" should be construed broadly enough to encompass any information able to be read from or written to an address in the addressable space accessed by processor. In an alternate implementation, the present invention can be implemented using an application specific integrated circuit (ASIC), as would be apparent to a person of ordinary skill in the art.

It is to be understood that the embodiments and variations shown and described herein are merely illustrative of the principles of this invention and that various modifications may be implemented by those skilled in the art without departing from the scope and spirit of the invention.

What is claimed is:

1. A method for detecting removal of a device connected to a network by a network connection, comprising:

monitoring said network connection;

generating an alarm in said removed device if said network connection is disconnected; and preventing a control of said device from being adjusted in response to said alarm being generated.

2. The method of claim 1, wherein said control is a volume control of an audio output and wherein said preventing steps prevents said volume control of said audio output from being adjusted to below a predefined minimum level.

3. The method of claim 1, wherein said control is a power control.

4. The method of claim 3, wherein said preventing step prevents said device from being turned off.

5. The method of claim 1, wherein said monitoring step is automatically activated in a passive manner.

6. The method of claim 1, wherein said monitoring step is manually activated by a user.

7. The method of claim 1, wherein said generating step can be prevented by entering a password.

8. The method of claim 1, wherein said monitoring step further comprises the step of polling one or more local network ports on said device.

9. The method of claim 1, wherein said generating step is performed only if said network connection is disconnected by an unauthorized user.

10. The method of claim 1, further comprising the step of determining that said network connection is disconnected by determining that a message is not received from a second device within a predefined time interval.

11. A system for detecting removal of a device connected to a network by a network connection, comprising:
a memory that stores computer-readable code; and
a processor operatively coupled to said memory, said processor configured to implement said computer-readable code, said computer-readable code configured to:
monitor said network connection;
generate an alarm in said removed device if said network connection is disconnected; and
prevent a control of said device from being adjusted in response to said alarm being generated.

12. The system of claim 11, wherein said control is a volume control of an audio output and wherein said preventing steps prevents said volume control of said audio output from being adjusted to below a predefined minimum level.

13. The system of claim 11, wherein said control is a power control.

14. The system of claim 13, wherein said preventing step prevents said device from being turned off.

15. The system of claim 11, wherein said monitoring step is automatically activated in a passive manner.

16. The system of claim 11, wherein said monitoring step is manually activated by a user.

17. The system of claim 11, wherein said generating step can be prevented by entering a password.

18. The system of claim 11, wherein said monitoring step further comprises the step of polling one or more local network ports on said device.

19. The system of claim 11, wherein said generating step is performed only if said network connection is disconnected by an unauthorized user.

20. A tangible article of manufacture for detecting removal of a device connected to a network by a network connection, comprising:
a tangible computer readable recordable medium, containing one or more programs which when executed implements the steps of:
a step to monitor said network connection;
a step to generate an alarm in said removed device if said network connection is disconnected; and
a step to prevent a control of said device from being adjusted in response to said alarm being generated.

* * * * *